(12) United States Patent
Ueno (10) Patent No.: US 7,684,957 B2
(45) Date of Patent: *Mar. 23, 2010

(54) COUNTING DEVICE, DISTANCE METER, COUNTING METHOD, AND DISTANCE MEASURING METHOD

(75) Inventor: Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 126 days.

This patent is subject to a terminal disclaimer.

(21) Appl. No.: 12/011,152

(22) Filed: Jan. 24, 2008

(65) Prior Publication Data

US 2008/0181354 A1 Jul. 31, 2008

(30) Foreign Application Priority Data

Jan. 25, 2007 (JP) ............... 2007-015020
Jul. 26, 2007 (JP) ............... 2007-194367
Dec. 11, 2007 (JP) ............... 2007-319447

(51) Int. Cl.
*G01B 5/02* (2006.01)
*G01P 3/36* (2006.01)
*G06M 3/00* (2006.01)

(52) U.S. Cl. ............... 702/158; 356/28.5; 377/28

(58) Field of Classification Search ............... 702/158, 702/57, 64, 66–67, 70–73, 75–76, 78–79, 702/85–86, 97, 106, 127–128, 134, 155, 702/159–160, 179, 182–183, 189, 199; 356/3, 356/4.01, 5.09, 28.5, 450, 482, 486, 492–493, 356/498, 614, 622, 900; 377/28–29

See application file for complete search history.

(56) References Cited

U.S. PATENT DOCUMENTS

2008/0304042 A1* 12/2008 Ueno ............... 356/4.1

OTHER PUBLICATIONS

Donati et al., Laser Diode Feedback Interferometer for Measurement of Displacements without Ambiguity, Jan. 1995, IEEE Journal of Quantum Electronics, vol. 31, No. 1, pp. 113-119.*
Ueda et al., "Distance Meter Using Self-Mixing Effect of Semiconductor Laser", Papers for 1994 Tokai-Section Joint Conference of the 8 Institutes of Electrical and Related Engineers, Abstract.
Yamada et. al., "Study of Compact Distance Meter by Self-Coupling Effect of Laser Diode", Bulletin of Aichi Institute of Technology, vol. 31B, pp. 35-42, 1996, Abstract.
Giuliani et al., "Laser diode self-mixing technique for sensing applications", Journal of Optics A: Pure and Applied Optics, pp. 283-294, 2002, Abstract.

* cited by examiner

*Primary Examiner*—Michael P. Nghiem
*Assistant Examiner*—Toan M Le
(74) *Attorney, Agent, or Firm*—Blakely, Sokoloff, Taylor & Zafman LLP (57) ABSTRACT

A counting device includes a counting unit, period measuring unit, frequency distribution unit, representative value unit, and correction value unit. The counting unit counts signals input during an interval. The signals have a single frequency when the physical quantity is constant. The period measuring unit measures the period of a signal interval. The frequency distribution unit generates the frequency distribution of signal periods from the measurement result. The representative value unit calculates the representative value of the distribution of periods from the frequency distribution. The correction value unit obtains a total sum Ns of frequencies in a class not more than a first predetermined multiple of the representative value and a total sum Nw of frequencies in a class not less than a second predetermined multiple of the representative value from the frequency distribution, and corrects the count result on the basis of the frequencies Ns and Nw.

20 Claims, 10 Drawing Sheets

COUNTING DEVICE, DISTANCE METER, COUNTING METHOD, AND DISTANCE MEASURING METHOD

BACKGROUND OF THE INVENTION

The present invention relates to a counting device which counts the number of signals and an interferometric distance meter which obtains the distance to a measurement target from which the number of interference waveforms has been measured by using the counting device.

Distance measurement by a laser using optical interference does not disturb a measurement target because of noncontact measurement, and has been used for a long time as a high-accuracy measurement method. Recently, attempts have been made to use a semiconductor laser as a light measurement light source to achieve a reduction in apparatus size. A typical example of such an apparatus is an apparatus using an FM heterodyne interferometer. This apparatus can measure a relatively long distance with high accuracy, but has a drawback of a complicated optical system because of the use of an interferometer outside a semiconductor laser.

In contrast to this, a measuring instrument has been proposed, which uses the interference between output light from a semiconductor laser and optical feedback from a measurement target inside the laser (self-mixing effect, self-coupling effect). The laser measuring instruments using self-mixing effect are disclosed in, for example, reference 1 (Tadashi Ueda, Jun Yamada, and Susumu Shitoh, "Distance Meter Using Self-Mixing Effect of Semiconductor Laser", Papers for 1994 Tokai-Section Joint Conference of the 8 Institutes of Electrical and Related Engineers), reference 2 (Jun Yamada, Susumu Shitoh, Norio Tuda, and Tadashi Ueda, "Study of Compact Distance Meter by Self-Coupling Effect of Laser Diode", Bulletin of Aichi Institute of Technology, Vol. 31B, pp. 35-42, 1996), and reference 3 (Guido Giuliani, Michele Norgia, Silvano Donati and Thierry Bosch, "Laser diode self-mixing technique for sensing applications", JOURNAL OF OPTICS A: PURE AND APPLIED OPTICS, pp. 283-294, 2002).

In such a laser measuring instruments using self-mixing effect, a photodiode built-in semiconductor laser has light-emitting, interference, and light-receiving functions at the same time, and hence allows great simplification of an external interference optical system. A sensor unit therefore comprises only a semiconductor laser and a lens, and becomes smaller than conventional sensor units. This instrument also has a characteristic feature that its distance measurement range is wider that of triangulation.

Figure 23:
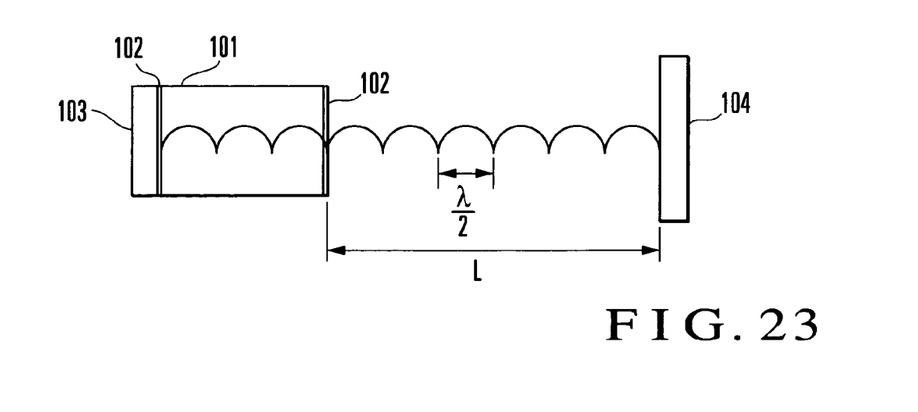
FIG. 23 is a view showing a complex resonance model of a semiconductor laser in a conventional laser measuring instrument.

FIG. 23 shows a complex resonance model of an FP type (Fabry-Perot type) semiconductor laser. Referring to FIG. 23, reference numeral 101 denotes a semiconductor laser; 102, a cleavage plane of a semiconductor crystal; 103, a photodiode; and 104, a measurement target. Part of reflected light from the measurement target 104 tends to return into the oscillation area. Slight optical feedback mixes with laser beam inside the resonance 101, resulting in unstable operation and noise (complex resonance noise or optical feedback noise). Even a very small amount of optical feedback relative to output light causes a noticeable change in the characteristics of the semiconductor laser. Such a phenomenon is not limited to a Fabry-Perot type (to be referred to as an FP type) semiconductor laser, and also occurs in other types of semiconductor lasers such as a vertical cavity surface emitting laser type (to be referred to as a VCSEL type hereinafter) and a distributed feedback laser type (to be referred to as a DFB laser type).

Let $\lambda$ be the oscillation wavelength of the laser and L be the distance from the cleavage plane 102 near the measurement target 104 to the measurement target 104. In this case, when the following resonance condition is satisfied, optical feedback and laser beam in the resonance 101 strengthen each other. Consequently, the laser power slightly increases.

$$L=n\lambda/2 \quad (1)$$

where n is an integer. This phenomenon can be sufficiently observed even with very weak scattered light from the measurement target 104 when an amplifying action occurs as the apparent reflectance inside the resonance 101 of the semiconductor laser increases.

Figure 24:
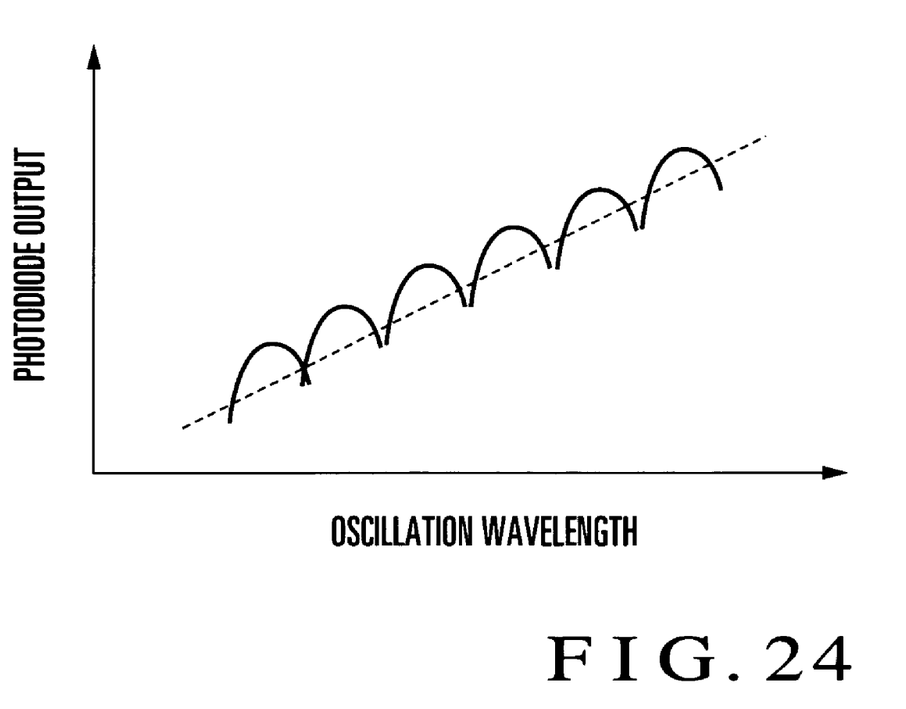
FIG. 24 is a graph showing the relationship between the oscillation wavelength of a semiconductor laser and the output waveform of a built-in photodiode.

A semiconductor laser emits laser beam having different frequencies in accordance with the magnitude of injection current. This laser therefore allows direct modulation of the oscillation frequency by using an injection current without requiring any external modulator. FIG. 24 shows the relationship between the oscillation wavelength and the output waveform of the photodiode 103 when the oscillation wavelength of the semiconductor laser is changed at a predetermined rate. When $L=n\lambda/2$ indicated in equation (1) is satisfied, the phase difference between optical feedback and laser beam inside the resonance 101 becomes 0° (in phase), and the optical feedback and the laser beam inside the resonance 101 strengthen each other most. When $L=n\lambda/2+\lambda/4$, the phase difference becomes 180° (in opposite phase), and the optical feedback and the laser beam inside the resonance 101 weaken each other most. As the oscillation wavelength of the semiconductor laser is changed, therefore, the laser power increases and decreases alternately and repeatedly. When the laser power is detected at this time by the photodiode 103 provided in the resonance 101, a staircase waveform having a constant period like that shown in FIG. 24 is obtained. Such a waveform is generally called an interference pattern.

Each of the elements of this staircase waveform, i.e., the interference pattern, is called a mode hop pulse (to be referred to as an MHP hereinafter). MHP is a phenomenon different from a mode hopping phenomenon. Assume that the distance to the measurement target 104 is represented by L1, and the number of MHPs is 10. In this case, as the distance decreases to L2 which is ½ of L1, the number of MHPs becomes five. That is, as the oscillation wavelength of the semiconductor laser changes in a predetermined time, the number of MHPs changes in proportion to the measurement distance. Therefore, detecting MHPs by the photodiode 103 and measuring the frequency of MHPs can easily measure the distance.

Conventional interference type distance meters including self-mixing type distance meters obtain the distance to a measurement target by measuring the number of MHPs using a counting device or by measuring the frequency of MHPs using FFT (Fast Fourier Transform).

In a distance meter using FFT, however, if a change in the oscillation wavelength of the laser is not linear with respect to time, the peak frequency calculated by FFT differs from the average frequency of MHPs which should be obtained, resulting in an error in the measured distance.

In a distance meter using a counting device, if noise such as disturbance light is counted as an MHP or there is an MHP which is not counted due to the pulse omissions of a signal, an error occurs in the number of MHPs counted by the counting device. As a result, an error occurs in the measured distance.

Note that such a count error is not limited to distance meters and may occur in other counting devices in the same manner.

SUMMARY OF THE INVENTION

The present invention has been made to solve the above problems, and has as its object to provide a counting device and counting method which can correct a count error and a distance meter and distance measuring method which can improve distance measurement accuracy by correcting a count error.

According to the present invention, there is provided a counting device comprising counting means for counting the number of signals input during a counting interval, the number of signals having a linear relationship with a physical quantity, and the signals having a substantially single frequency when the physical quantity is constant, period measurement means for measuring a period of a signal every time a signal is input during the counting interval, frequency distribution generating means for generating a frequency distribution of signal periods during the counting interval from a measurement result obtained by the period measurement means, representative value calculation means for calculating a representative value of a distribution of periods of signals from the frequency distribution generated by the frequency distribution generating means, and correction value calculation means for obtaining a total sum Ns of frequencies in a class not more than a first predetermined multiple of the representative value calculated by the representative value calculation means and a total sum Nw of frequencies in a class not less than a second predetermined multiple of the representative value from the frequency distribution generated by the frequency distribution generating means, and correcting a count result obtained by the counting means on the basis of the frequencies Ns and Nw.

According to the present invention, there is provided a distance meter comprising a semiconductor laser which emits laser beam to a measurement target, a laser driver which causes the semiconductor laser to operate such that a first oscillation interval including at least an interval in which an oscillation wavelength continuously and monotonically increases and a second oscillation interval including at least an interval in which the oscillation wavelength continuously and monotonically decreases are alternately present, a signal acquisition device which acquires an electrical signal containing an interference waveform caused by laser beam emitted from the semiconductor laser and optical feedback from the measurement target, counting means for counting the number of interference waveforms contained in an output signal from the signal acquisition device, period measurement means for measuring a period of an interference waveform every time an interference waveform is input during the counting interval, frequency distribution generating means for generating a frequency distribution of periods of interference waveforms during the counting interval from a measurement result obtained by the period measurement means, representative value calculation means for calculating a representative value of a distribution of periods of interference waveforms from the frequency distribution generated by the frequency distribution generating means, correction value calculation means for obtaining a total sum Ns of frequencies in a class not more than a first predetermined multiple of the representative value calculated by the representative value calculation means and a total sum Nw of frequencies in a class not less than a second predetermined multiple of the representative value from the frequency distribution generated by the frequency distribution generating means, and correcting a count result obtained by the counting means on the basis of the frequencies Ns and Nw, and arithmetic means for obtaining a distance to the measurement target from a count result corrected by the correction value calculation means.

According to the present invention, there is provided a counting method comprising the steps of counting the number of signals input during a counting interval, the number of signals having a linear relationship with a physical quantity, and the signals having a substantially single frequency when the physical quantity is constant, measuring a period of a signal every time a signal is input during the counting interval, generating a frequency distribution of signal periods during the counting interval from a period measurement result, calculating a representative value of a distribution of periods of signals from the frequency distribution, and obtaining a total sum Ns of frequencies in a class not more than a first predetermined multiple of the representative value and a total sum Nw of frequencies in a class not less than a second predetermined multiple of the representative value from the frequency distribution, and correcting the number of signals counted on the basis of the frequencies Ns and Nw.

According to the present invention, there is provided distance measuring method comprising the steps of causing a semiconductor laser to operate such that a first oscillation interval including at least an interval in which an oscillation wavelength continuously and monotonically increases and a second oscillation interval including at least an interval in which the oscillation wavelength continuously and monotonically decreases are alternately present, acquiring an electrical signal containing an interference waveform caused by laser beam emitted from the semiconductor laser and optical feedback from a measurement target, counting the number of interference waveforms contained in the acquired electrical signal, measuring a period of an interference waveform every time an interference waveform is input during a counting interval in which the number of interference waveforms is counted, generating a frequency distribution of periods of interference waveforms during the counting interval from a period measurement result, calculating a representative value of a distribution of periods of interference waveforms from the frequency distribution, obtaining a total sum Ns of frequencies in a class not more than a first predetermined multiple of the representative value and a total sum Nw of frequencies in a class not less than a second predetermined multiple of the representative value from the frequency distribution, and correcting the number of interference waveforms counted on the basis of the frequencies Ns and Nw, and obtaining a distance to the measurement target from a corrected number of interference waveforms.

DESCRIPTION OF THE PREFERRED EMBODIMENTS

First Embodiment

The present invention is a technique of measuring a distance on the basis of the interference signal of a wave emitted at the time of sensing using wavelength modulation and a wave reflected by a target. This technique can therefore be applied to optical interferometers other than self-misting type interferometers and to interferometers other than optical interferometers. A case in which the self-mixing of a semiconductor laser is used will be described in more detail. When the oscillation wavelength of the semiconductor laser is changed while laser beam is applied from the laser to a measurement target, the displacement of the measurement target is reflected in the number of MHPs while the oscillation wavelength changes from the minimum oscillation wavelength to the maximum oscillation wavelength (or changes from the maximum oscillation wavelength to the minimum oscillation wavelength). Therefore, checking the number of MHPs as the oscillation wavelength is changed makes it possible to detect the state of a measurement target. The above description has been made about the basis principle of the interferometer.

Figure 1:
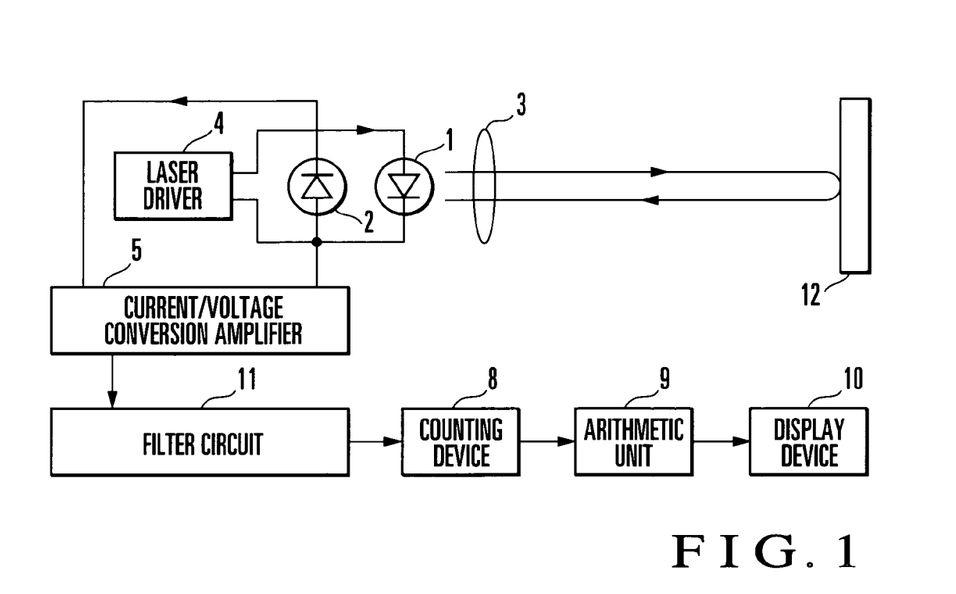
FIG. 1 is a block diagram showing the arrangement of a distance meter according to the first embodiment of the present invention.

The first embodiment of the present invention will be described below with reference to the accompanying drawings. FIG. 1 shows the arrangement of a distance meter according to the first embodiment of the present invention. The distance meter in FIG. 1 includes a semiconductor laser 1 which emits laser beam to a measurement target, a lens 3 which focuses light from the semiconductor laser 1 to apply it to a measurement target 12 and also focuses optical feedback from the measurement target 12 to make it strike the semiconductor laser 1, a photodiode (signal acquisition device) 2 serving as a light-receiving device which converts the interference light between the laser beam emitted from the semiconductor laser 1 and the optical feedback from the measurement target 12 into an electrical signal, a laser driver 4 which causes the semiconductor laser 1 to alternately repeat the first oscillation interval including an interval in which the oscillation wavelength of the semiconductor laser 1 continuously increases and the second oscillation interval including an interval in which the oscillation wavelength continuously decreases, a current/voltage conversion amplifier 5 which converts an output current from the photodiode 2 into a voltage and amplifies it, a filter circuit 11 which removes a carrier wave from an output voltage from the current/voltage conversion amplifier 5, a counting device 8 which counts the number of MHPs contained in an output voltage from the filter circuit 11, an arithmetic unit 9 which calculates the distance to the measurement target 12 from the number of MHPs, and a display device 10 which displays the calculation result obtained by the arithmetic unit 9.

For easy description, assume that as the semiconductor laser 1, a laser of a type (VCSEL type or DFB laser type) that has no mode hopping phenomenon is used.

For example, the laser driver 4 supplies a triangular wave driving current, which repeatedly increases and decreases at a constant change rate with respect to time, as an injection current and supplies it to the semiconductor laser 1. With this operation, the semiconductor laser 1 is driven to alternately repeat the first oscillation interval in which the oscillation wavelength continuously increases at a constant change rate in proportion to the magnitude of an injection current and the second oscillation interval in which the oscillation wavelength continuously decreases at a constant change rate.

Figure 2:
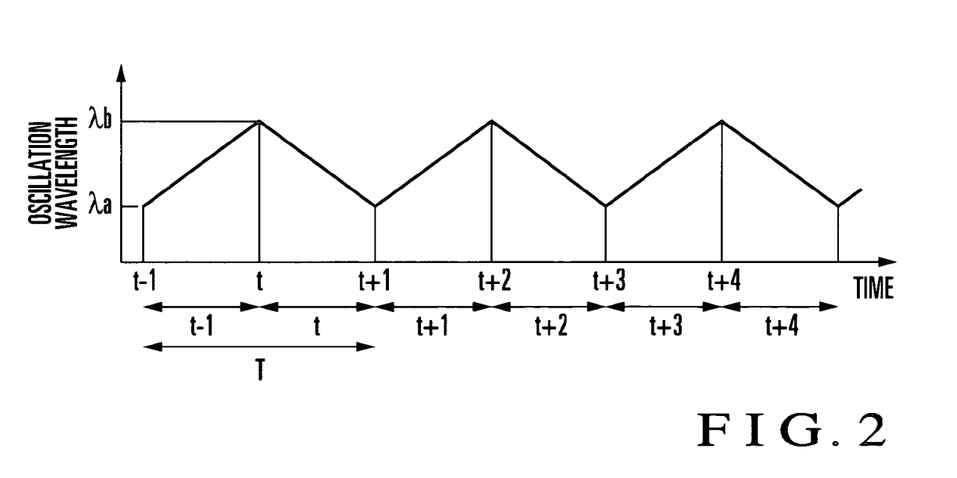
FIG. 2 is a graph showing a temporal change in the oscillation wavelength of a semiconductor laser in the first embodiment of the present invention.

FIG. 2 shows a temporal change in the oscillation wavelength of the semiconductor laser 1. Referring to FIG. 2, reference symbol t−1 denotes the (t−1)th oscillation interval; t, the tth oscillation interval; t+1, the (t+1)th oscillation interval; t+2, the (t+2)th oscillation interval; t+3, the (t+3)th oscillation interval; t+4, the (t+4)th oscillation interval; λa, the minimum value of the oscillation wavelength in each interval; λb, the maximum value of the oscillation wavelength in each interval; and T, the period of a rectangular wave. In this embodiment, the maximum value λb and minimum value λa of the oscillation wavelength are kept constant, and a difference λb−λa between them is also kept constant.

The laser beam emitted from the semiconductor laser 1 is focused by the lens 3 and strikes the measurement target 12.

The light reflected by the measurement target 12 is focused by the lens 3 and strikes the semiconductor laser 1. It is not, however, essential that the lens 3 focuses light. The photodiode 2 converts an optical output from the semiconductor laser 1 into a current. The current/voltage conversion amplifier 5 converts an output current from the photodiode 2 into a voltage and amplifies it.

Figure 3A:
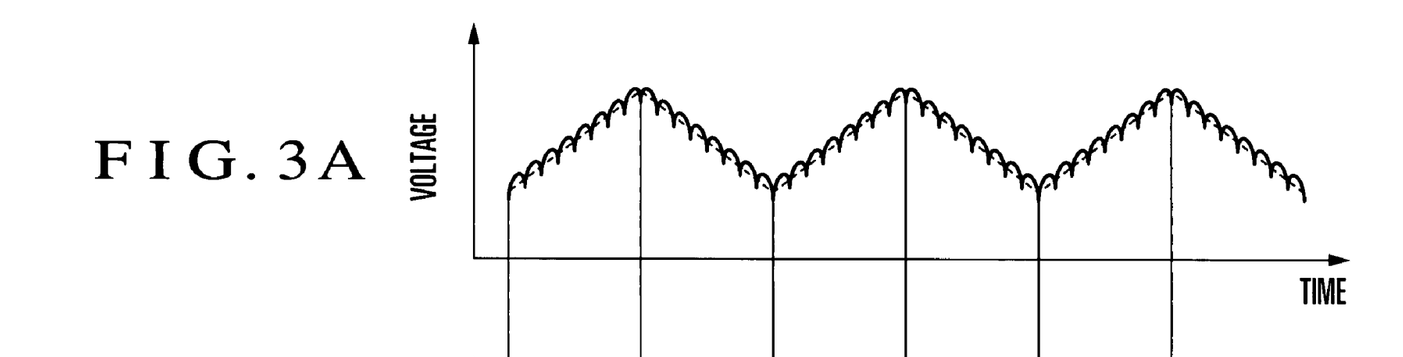
FIG. 3A is a graph schematically showing the output voltage wavelength of a current/voltage conversion amplifier in the first embodiment of the present invention.
Figure 3B:
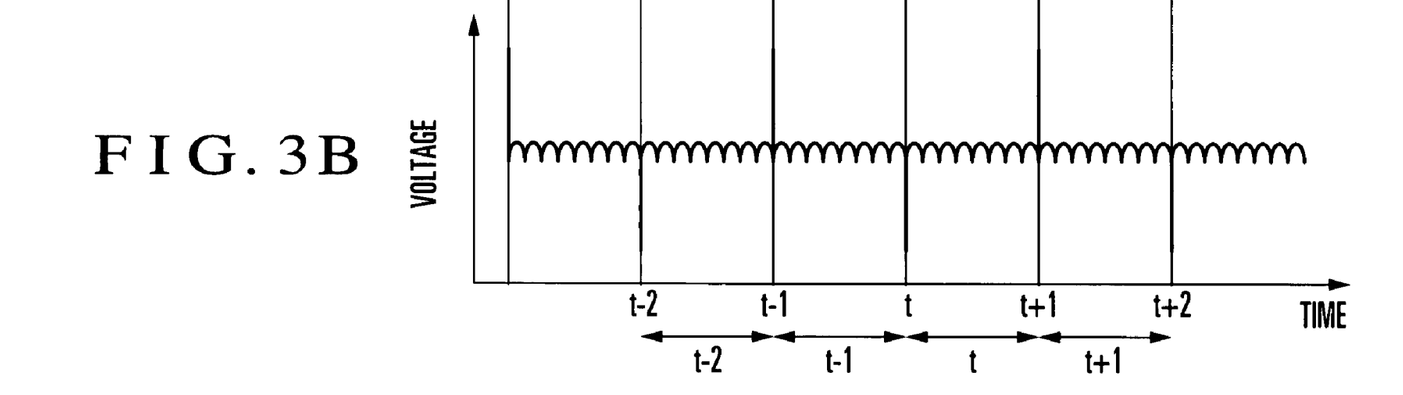
FIG. 3B is a graph schematically showing the output voltage waveform of a filter circuit.

The filter circuit 11 has a function of extracting a superimposed signal from a modulated wave. FIG. 3A schematically shows the output voltage waveform of the current/voltage conversion amplifier 5. FIG. 3B schematically shows the output voltage waveform of the filter circuit 11. FIGS. 3A and 3B show the process of extracting the MHP waveform (superimposed wave) in FIG. 3B by removing the oscillation waveform (carrier wave) of the semiconductor laser 1 in FIG. 2 from the waveform (modulated wave) in FIG. 3A which is an output from the photodiode 2.

Figure 4:
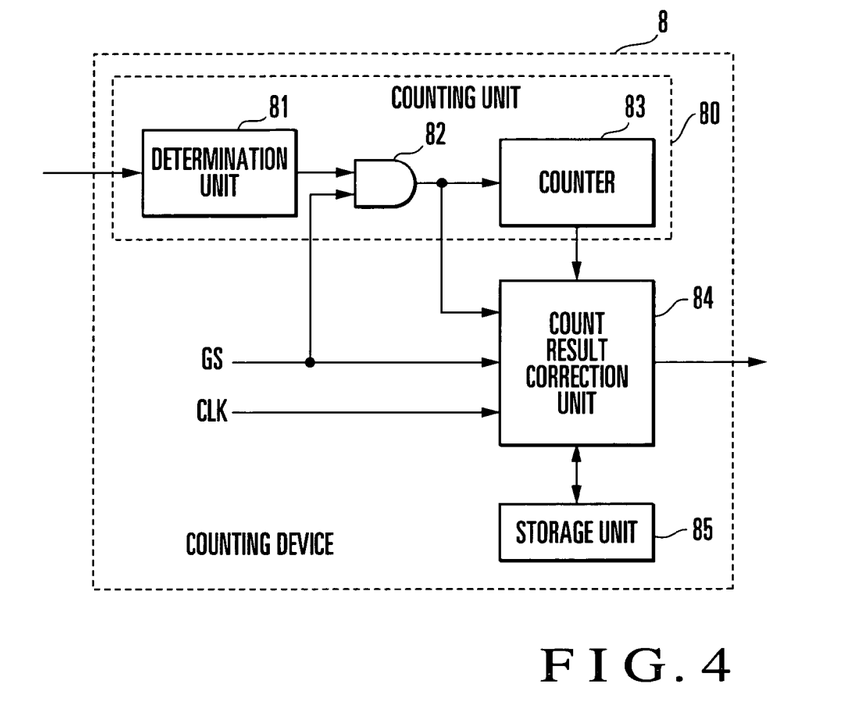
FIG. 4 is a block diagram showing an example of the arrangement of a counting device in the first embodiment of the present invention.

The counting device 8 counts the number of MHPs contained in an output voltage from the filter circuit 11 in each of first oscillation intervals t−1, t+1, and t+3 and second oscillation intervals t, t+2, and t+4. FIG. 4 shows an example of the arrangement of the counting device 8. The counting device 8 comprises a determination unit 81, AND operation unit (AND) 82, counter 83, count result correction unit 84, and storage unit 85. The determination unit 81, AND 82, and counter 83 constitute a counting unit 80 which counts MHPs (interference waveforms or input signals) input during a counting interval.

Figure 5:
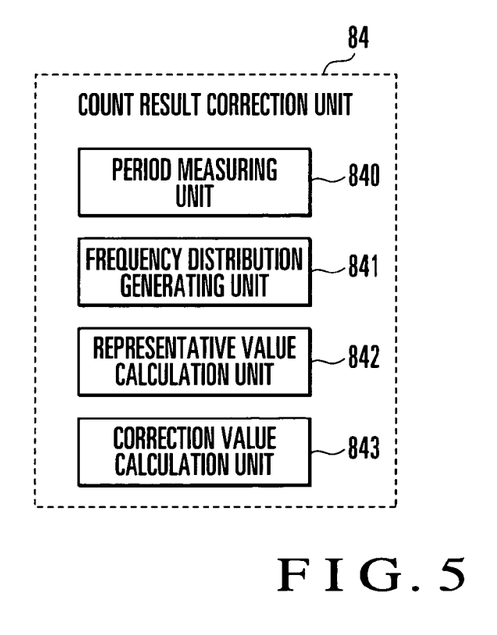
FIG. 5 is a block diagram showing an example of the arrangement of a count result correction unit in the counting device in FIG. 4.

FIG. 5 shows an example of the arrangement of the count result correction unit 84. The count result correction unit 84 comprises a period measuring unit 840, frequency distribution generating unit 841, representative value calculation unit 842, and correction value calculation unit 843.

Figure 6A:
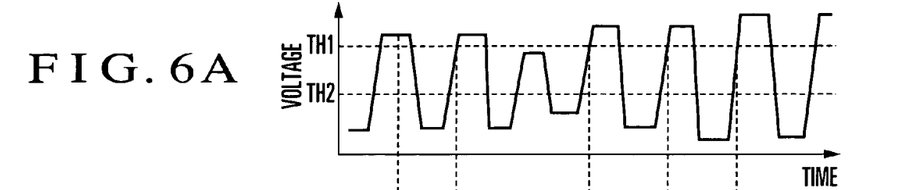
FIGS. 6A to 6F are timing charts for explaining the operation of the counting device in FIG. 4.
Figure 6B:
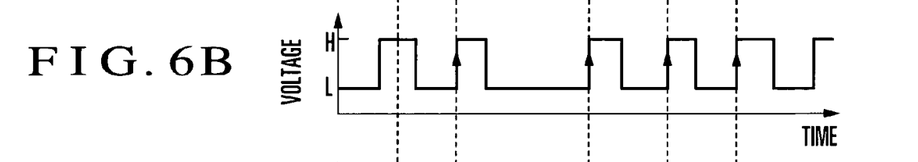
Figure 6C:
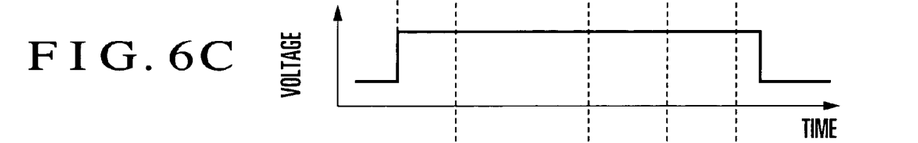
Figure 6D:
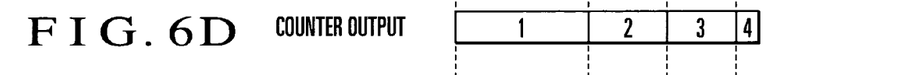
Figure 6E:
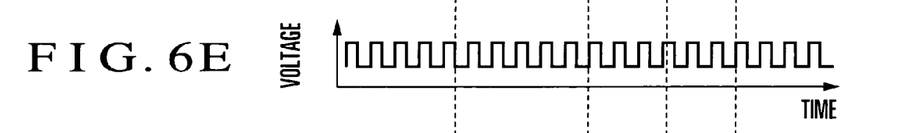
Figure 6F:
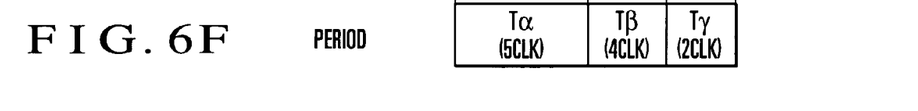

FIGS. 6A to 6F explain the operation of the counting device 8. FIG. 6A shows the waveform of an output voltage from the filter circuit 11, i.e., an MHP waveform. FIG. 6B shows an output from the determination unit 81 which corresponds to FIG. 6A. FIG. 6C shows a gate signal GS input to the counting device 8. FIG. 6D shows the count result obtained by the counter 83 which corresponds to FIG. 6B. FIG. 6E shows a clock signal CLK input to the counting device 8. FIG. 6F shows the measurement result obtained by the period measuring unit 840 which corresponds to FIG. 6B.

First of all, the determination unit 81 of the counting device 8 determines whether an output voltage from the filter circuit 11 shown in FIG. 6A is at high level (H) or low level (L), and outputs a determination result like that shown in FIG. 6B. The determination unit 81 binarizes an output from the filter circuit 11 by determining that the output voltage from the filter circuit 11 is at high level when it increases to a threshold TH1 or more, and determining that the output voltage from the filter circuit 11 is at low level when it decreases to a threshold TH2 (TH2<TH1) or less.

The AND 82 outputs the result of AND operation between an output from the determination unit 81 and the gate signal GS like that shown in FIG. 6C. The counter 83 counts leading edges of an output from the AND 82 (FIG. 6D). The gate signal GS is a signal which rises at the start of a counting interval (the first or second oscillation interval in this embodiment), and falls at the end of the counting interval. The counter 83 counts the number of leading edges of an output from the AND 82 during a counting interval (i.e., the number of leading edges of MHPs).

The period measuring unit 840 of the count result correction unit 84 measures the period of a leading edge of the output from the AND 82 during the counting interval (i.e., the period of an MHP) every time a leading edge is generated. At this time, the period measuring unit 840 measures the period of an MHP with the period of the clock signal CLK shown in FIG. 6E being regarded as one unit. In the case shown in FIG. 6F, the period measuring unit 840 sequentially measures Tα, Tβ, and Tγ as the periods of MHPs. As is obvious from FIGS. 6E and 6F, the magnitudes of the periods Tα, Tβ, and Tγ are five clocks, four clocks, and two clocks, respectively. The frequency of the clock signal CLK is much higher than the maximum frequency which MHPs can take.

The storage unit 85 stores the count result obtained by the counter 83 and the measurement result obtained by the period measuring unit 840.

After the gate signal GS falls and a counting interval finishes, the frequency distribution generating unit 841 of the count result correction unit 84 generates the frequency distribution of the periods of the MHPs during a counting interval from the measurement result stored in the storage unit 85.

Subsequently, the representative value calculation unit 842 of the count result correction unit 84 calculates a median T0 of the periods of the MHPs from the frequency distribution generated by the frequency distribution generating unit 841.

The correction value calculation unit 843 of the count result correction unit 84 obtains a total sum Ns of frequencies in a class equal to or less than 0.5 times (first predetermined multiple) the median T0 of the periods and a total sum Nw of frequencies in a class equal to or more than 1.5 times (second predetermined multiple) the median T0 of the periods from the frequency distribution generated by the frequency distribution generating unit 841, and corrects the count result obtained by the counter 83 as follows:

$$N' = N + Nw - Ns \quad (2)$$

where N is the number of MHPs as the count result obtained by the counter 83, and N' is the count result after correction.

Figure 7:
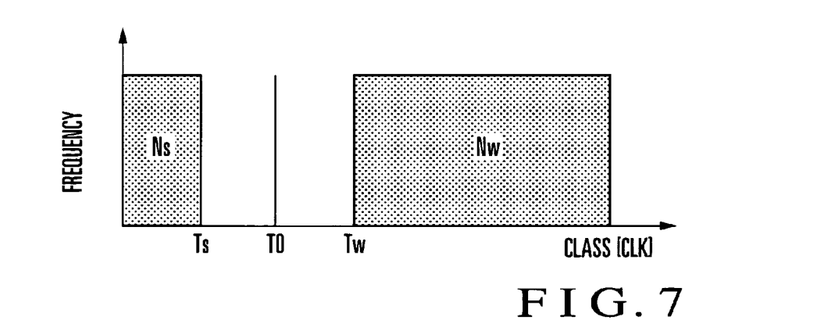
FIG. 7 is a graph showing an example of the frequency distribution of periods in the first embodiment of the present invention.

FIG. 7 shows an example of a frequency distribution. Referring to FIG. 7, reference symbol Ts denotes a class value 0.5 times the median T0 of the periods; and Tw, a class value 1.5 times the median T0 of the periods. Obviously, the classes in FIG. 7 are the representative values of the periods of the MHPs. For simplicity, FIG. 7 does not illustrate the frequency distributions between the median T0 and Ts and between the median T0 and Tw.

Figures 8A, 8B:
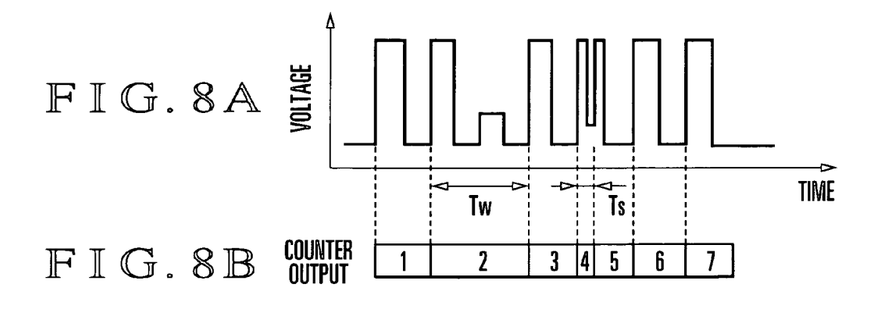
FIGS. 8A and 8B are views for explaining the principle of correcting the count result of a counter in the first embodiment of the present invention.

FIGS. 8A and 8B explain the principle of correcting the count result obtained by the counter 83. More specifically, FIG. 8A schematically shows the waveform of an output voltage from the filter circuit 11, i.e., an MHP waveform. FIG. 8B shows the count result obtained by the counter 83 which corresponds to FIG. 8A.

The period of MHPs normally varies depending on the distance to the measurement target 12. If, however, the distance to the measurement target 12 is invariable, MHPs appear at the same period. Due to noise, however, an omission occurs in the MHP waveform or a waveform which should not be counted as a signal is generated, resulting in an error in the number of MHPs.

When an omission occurs in a signal, a period Tw of an MHP at the position where the omission has occurred becomes about twice the proper period. That is, when the period of an MHP is about twice the median T0 or more, it can be determined that an omission has occurred in the signal. Therefore, omissions in the signal can be corrected by regarding the total sum Nw of the frequencies in the class equal to or more than the period Tw as the number of omissions in the signal and adding Nw to a count result N of the counter 83.

In addition, the period Ts of the MHP at the position where noise is counted becomes about 0.5 times the proper period.

That is, when the period of an MHP is equal to or less than about 0.5 times the median, it can be determined that signals are excessively counted. Therefore, noise which has been erroneously counted can be corrected by regarding the total sum Ns of the frequencies in the class equal to or less than the period Ts as the number of times a signal has been counted and subtracting Ns from the count result N obtained by the counter 83.

The above is the principle of correcting a count result, which is indicated by equation (2). In this embodiment, Ts is set to the value 0.5 times the median T0 of the periods, and Tw is set to the value 1.5 times the median T0 instead of 2 times the median T0. The reason why Tw is set to the value 1.5 times the median T0 will be described later.

The correction value calculation unit 843 outputs the corrected count result N' calculated by equation (2) to the arithmetic unit 9. The counting device 8 performs the above processing in each of the first oscillation intervals t−1, t+1, and t+3 and the second oscillation intervals t, t+2, and t+4.

The arithmetic unit 9 obtains the distance to the measurement target 12 on the basis of the number N' of MHPs measured by the counting device 8. The number of MHPs in a predetermined interval is proportional to the measured distance. Therefore, obtaining the relationship between the number of MHPs in a constant counting interval (the first or second oscillation interval in this embodiment) in advance and registering it in a database (not shown) in the arithmetic unit 9 in advance allows the arithmetic unit 9 to obtain the distance to the measurement target 12 by acquiring the value of the distance corresponding to the number N' of MHPs measured by the counting device 8 from the database.

Alternatively, obtaining and setting a mathematical expression representing the relationship between the number of MHPs in a counting interval and the distance in advance allows the arithmetic unit 9 to calculate the distance to the measurement target 12 by substituting the number N' of MHPs measured by the counting device 8 into the mathematical expression. The arithmetic unit 9 performs the above processing in each of the first oscillation intervals t−1, t+1, and t+3 and the second oscillation intervals t, t+2, and t+4.

The display device 10 displays the distance (displacement) to the measurement target 12 which is calculated by the arithmetic unit 9 in real time.

As described above, this embodiment measures the periods of MHPs in a counting interval and generates the frequency distribution of the periods of the MHPs in the counting interval from the measurement result. The embodiment then calculates the median of the periods of the MHPs from the frequency distribution, and obtains the total sum Ns of the frequencies in the class equal to or less than 0.5 times the median and the total sum Nw of the frequencies in the class equal to more than 1.5 times the median from the frequency distribution. The embodiment can correct an MHP count error by correcting the count result obtained by the counter on the basis of the total sums Ns and Nw, thereby improving the distance measurement accuracy.

Note that the counting device 8 and the arithmetic unit 9 in this embodiment can be implemented by, for example, a computer including a CPU, storage device, and interface and programs which control these hardware resources. Programs for operating such a computer are provided while being recorded on a recording medium such as a flexible disk, CD-ROM, DVD-ROM, or memory card. The CPU writes a read program in the storage device, and executes processing described in this embodiment in accordance with the program.

The reason why the median of the frequency distribution of periods is used as a reference period of MHPs will be described next, together with the reason why the period threshold to be set when the frequency Nw is obtained is 1.5 times the median.

Figure 9:
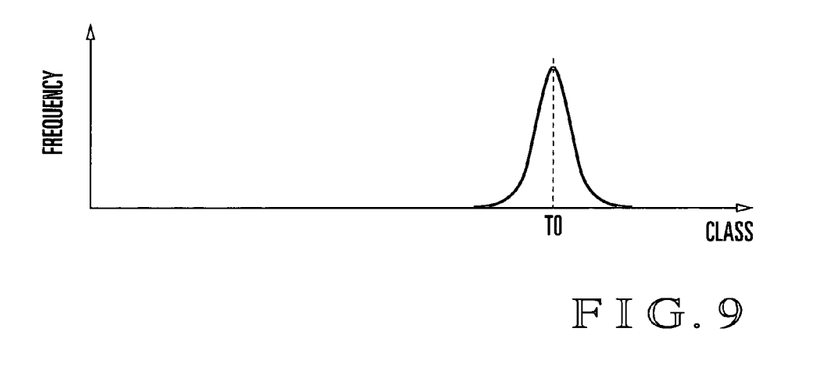
FIG. 9 is a graph showing the frequency distribution of the periods of mode hop pulses.

Correction of the count result obtained in a case in which the periods of MHPs are divided by two because of erroneous counting of noise will be described first. If the oscillation wavelength of the semiconductor laser linearly changes, periods T of MHPs exhibit a normal distribution centered on T0 obtained by dividing a measurement period Tc by a count N of MHPs (FIG. 9).

Consider next the periods of MHPs which are divided by two due to noise. The periods of MHPs which are divided by two as a result of excessively counting noise are the periods divided at a random ratio. However, the periods before division have a normal distribution centered on T0, and hence the periods of the MHPs divided by two exhibit a frequency distribution symmetrical with respect to 0.5T0. (a in FIG. 10).

Figure 10:
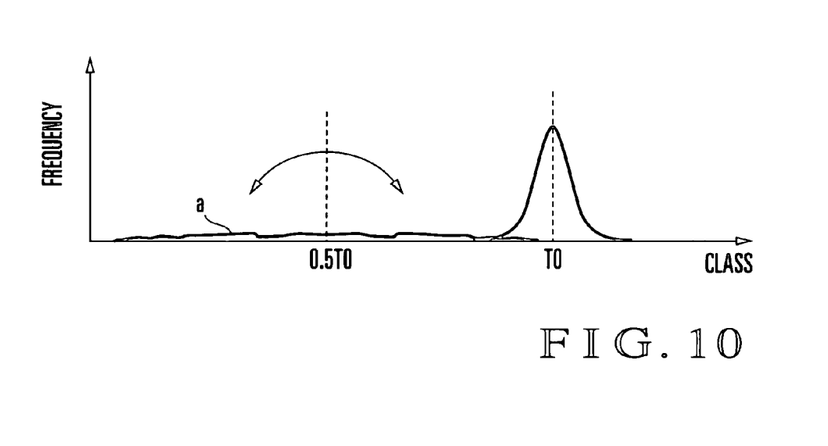
FIG. 10 is a graph showing the frequency distribution of the periods of mode hop pulses containing noise.

With regard to the frequency distribution of the periods of n % of MHPs containing noise, the average and median of the periods of the MHPs are calculated assuming that the periods of n % of MHPs are divided by two due to noise.

The sum of all periods is always a counting interval Tc and does not change. If, however, the periods of MHPs are divided by two due to noise, since the integral value of frequencies becomes (1+n[%]) N, the average of the periods of the MHPs becomes (1/(1+n[%])) T0.

Figure 11:
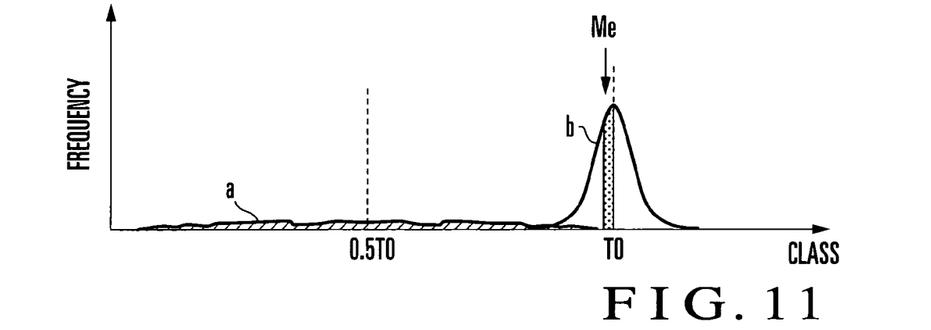
FIG. 11 is a graph showing the median of the periods of the mode hop pulses containing noise.

If a portion of a noise distribution which is superimposed on a normal distribution is neglected, the cumulative frequency of noise divided by two is twice the frequency included in the class between the median (Me) and T0. Therefore, the median of the periods of MHPs is located at a position where an area b is twice an area a in FIG. 11.

Excel (registered trademark) which is software available from Microsoft includes a function termed NORMSDIST( ) which can express the internal ratio between the both side values in the interval between the average of a normal distribution and $\alpha\sigma$ by "(1−(1−NORMSDIST($\alpha$))*2)*100 [%]". Using this function makes it possible to express the median of the periods of MHPs as follows:

$$(1-(1-\text{NORMSDIST}((\text{median}-T0)/\sigma))*2)*(100-n)/2=n[\%] \tag{3}$$

According to the above description, if a standard deviation a is set to 0.02T0, an average T0' and median T0' of MHPs are calculated as follows when the periods of 10% of the MHPs are divided by two due to noise.

$$T0'=(1/(1+0.1))T0=0.91T0 \tag{4}$$

$$T0'=0.995T0 \tag{5}$$

Assume that in this case, both the average and the median are represented by T0'. The counter value (the integral value of frequencies) is 1.1N, and the count error is 10%.

Figure 12:
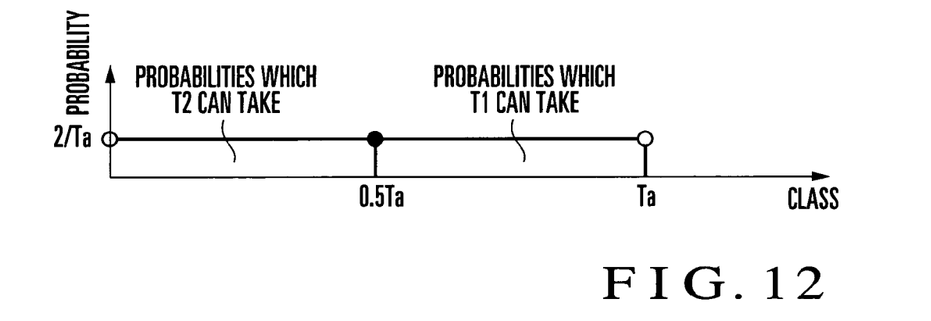
FIG. 12 is a graph showing the probability distribution of the periods of mode hop pulses whose periods are divided by two.

Consider the probabilities of intervals which two periods T1 and T2 (T1≧T2) after division of an MHP with a given period Ta by two can take. Assume that noise is randomly generated. As shown in FIG. 12, T2 can take the value defined by 0<T2≦Ta/2 at the same probability. Likewise, T1 can take the value defined by T/2≦T1<Ta at the same probability. The area of the probability distribution which T1 in FIG. 12 can take and the area of the probability distribution which T2 can take are both 1.

The periods Ta have a normal distribution centered on T0. If, therefore, Ta is regarded as a set, the frequency distribution of probabilities which T2 can take has the same shape as the cumulative frequency distribution of normal distributions with an average of 0.5T0 and a standard deviation of 0.5σ.

Figure 13:
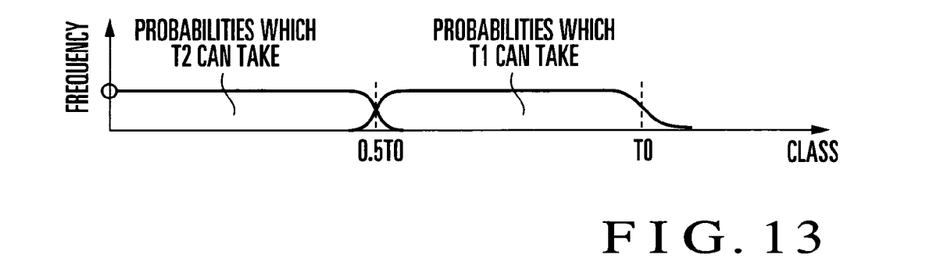
FIG. 13 is a graph showing the frequency distribution of the periods of mode hop pulses whose periods are divided by two.

As shown in FIG. 13, the frequency distribution of probabilities which T1 can take has a shape similar to the shape obtained by overlapping the cumulative frequency distribution of normal distribution with an average of 0.5T0 and a standard deviation of 0.5σ on the cumulative frequency distribution of normal distributions with an average of T0 and a standard deviation of σ. In this case, each of the numbers of T1 and T2 is equal to a count n[%]·N of MHPs whose periods are divided by two.

If a count n[%]·N of MHPs whose periods are divided by two due to noise can be counted, a count N of MHPs can be derived by $$N=N'-n[\%]\cdot N \qquad (6)$$

If Tb can be set such that a count Ns of MHPs having periods equal to or less than Tb is equal to the count n[%]·N of MHPs whose periods are divided by two, the count n[%]·N of MHPs whose periods are divided by two can be indirectly counted by counting the count Ns of MHPs having periods equal to or less than Tb.

Figure 14:
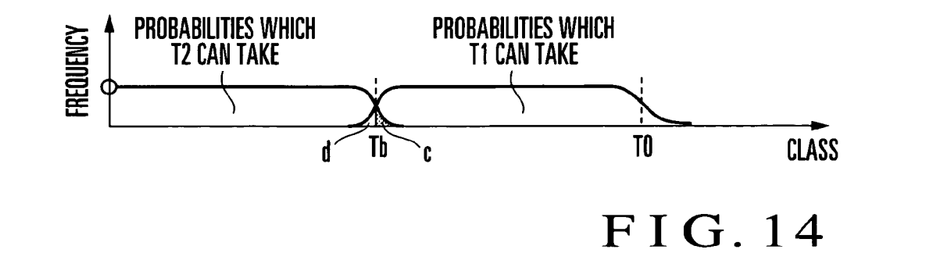
FIG. 14 is a graph showing the frequency distribution of the periods of mode hop pulses whose periods are divided by two.

Referring to FIG. 14, when the frequency (c in FIG. 14) of the period T2 of MHPs having periods equal to or more than Tb is equal to the frequency (d in FIG. 14) of the period T1 of MHPs having periods less than Tb, the number of MHPs having periods equal to or less than Tb becomes equal to the number of T2, i.e., the count Ns (=n[%]·N) of MHPs whose periods are divided by two. That is, the count N of MHPs can be expressed by $$N=N'-n[\%]\cdot N=N'-Ns \qquad (7)$$

Since the frequency shapes of T1 and T2 are symmetrical with respect to 0.5Ta, performing determination by using 0.5Ta as a threshold makes it possible to accurately count the frequency Ns (=n[%]·N) of MHPs whose periods are divided by two.

Although the count n[%]·N of MHPs whose periods are divided by two can be indirectly counted by counting the number of MHPs having periods equal to or less than 0.5T0, T0 cannot be calculated from the frequency distribution (FIG. 10) of the periods of MHPs containing noise. If the parent population of MHPs is so ideal as to make the mode become equal to T0 and has a large modulus like the frequency distribution in FIG. 10, the mode can be used as T0'.

Figure 15:
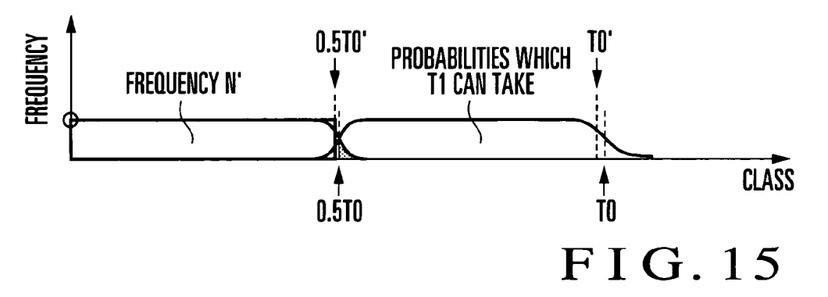
FIG. 15 is a graph showing the frequency distribution of the periods of mode hop pulses whose periods are divided by two.

In this case, counting of the count n[%]·N of MHPs using an average or a median T0' will be described. If T0'=y·T0 is set, and Ns is obtained by substituting T0' instead of T0, a frequency Ns' of periods smaller than 0.5T0' determined as the number of MHPs whose periods are divided by two is expressed by y·n[%]·N (FIG. 15).

If the average or median T0' is used, a count value Nt after correction is expressed by $$\begin{aligned} Nt &= N' - Ns' \\ &= (1 + n[\%])N - yn[\%]N \\ &= (1 + (1-y)n[\%])N \\ &= N + (1-y)n[\%]N \end{aligned} \qquad (8)$$

Figure 16:
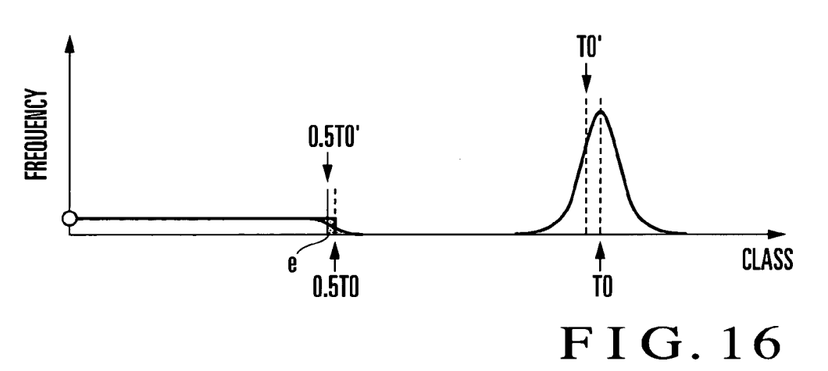
FIG. 16 is a graph showing errors after the correction of counter values.

Note that (1−y)n[%]N which is an error after correction represents the frequency of a portion e in FIG. 16.

An example of correction of the count result obtained by the counter 83 by using the average or median T0' will be described below.

If a standard deviation is expressed by σ=0.02T0 and the periods of 10% of MHPs are divided by two due to noise (the count result includes an error of 10%), the average T0' of the periods of the MHPs is 0.91T0, and the median T0' is 0.9949T0. Therefore, when the average T0' is used, y is 0.91. When the median T0' is used, y is 0.9949. A count result N' after correction is calculated as follows:

$$N'=(1+0.1(1-0.91))N=1.009N \qquad (9)$$

$$N'=(1+0.1(1-0.995))N=1.0005N \qquad (10)$$

Equation (9) represents the count result N' after correction when the average T0' is used. Equation (10) represents the count result N' after correction when the median T0' is used. An error in the count result N' obtained when the average T0' is used is 0.9%. An error in the count result N' obtained when the median T0' is used is 0.05%.

Assume that a standard deviation is expressed by σ=0.05T0 and the periods of 20% of MHPs are divided by two due to noise (the count result includes an error of 20%). In this case, the average T0' of the periods of the MHPs is 0.83T0, and the median T0' is 0.9682T0. Therefore, when the average T0' is used, y is 0.83. When the median T0' is used, y is 0.968. The count result N' after correction is calculated as follows:

$$N'=(1+0.2(1-0.83))N=1.034N \qquad (11)$$

$$N'=(1+0.2(1-0.968))N=1.0064N \qquad (12)$$

Equation (11) represents the count result N' after correction when the average T0' is used. Equation (12) represents the count result N' after correction when the median T0' is used. An error in the count result N' obtained when the average T0' is used is 3.4%. An error in the count result N' obtained when the median T0' is used is 0.64%.

It is obvious from the above description that the error in the count result N' after correction can be reduced by correcting the count result N by using the median of the periods of the MHPs.

Figure 17:
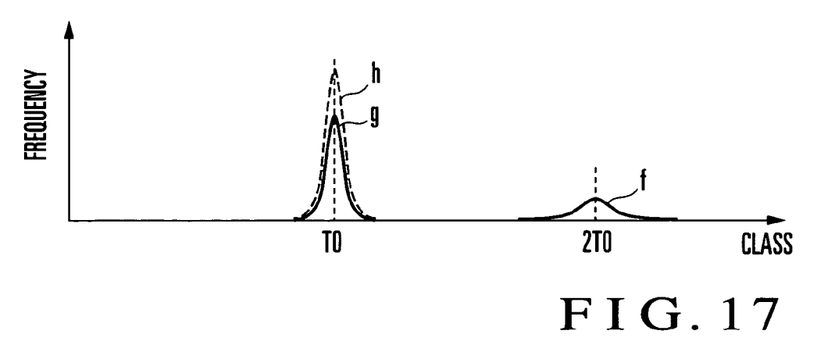
FIG. 17 is a graph showing the frequency distribution of the periods of mode hop pulses whose periods are doubled.

Correction of a count result in a case in which an omission has occurred in an MHP waveform will be described next. The periods of MHPs in a case in which an omission has occurred at the time of counting because of the low intensity of the MHP exhibit a normal distribution (f in FIG. 17) with an average of 2T0 and a standard deviation of 2σ because the proper periods of the MHPs exhibit a normal distribution centered on T0. If m[%] of the MHPs have been omitted, the frequency of the periods of the MHPs whose periods are doubled due to the omissions is represented by Nw (=m[%]·N). In addition, the frequency of periods of almost T0 after a reduction in the number of MHPs at the time of counting due to the omissions is represented by g in FIG. 17. A reduction in frequency represented by h in FIG. 17 is 2 Nw (=2 m[%]). Therefore, a proper count N' of MHPs without any omissions of MHPs at the time of counting can be expressed by $$N'=N+m[\%]=N+Nw \qquad (13)$$

Figure 18:
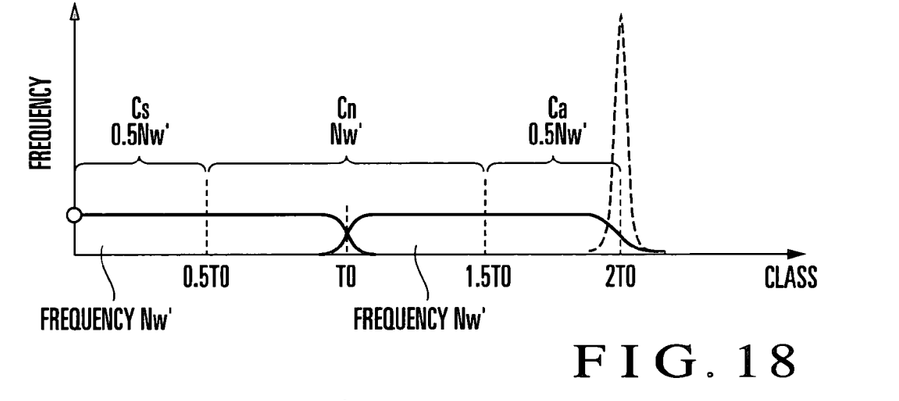
FIG. 18 is a graph showing the frequency distribution of the periods of mode hop pulses, of mode hop pulses omitted at the time of counting, whose periods are divided by two.

Consider next a threshold for periods at the time of counting Nw for the correction of a count result. Assume that p[%] of the frequency Nw of the periods of MHPs whose periods are doubled due to omissions at the time of counting are divided by two due to noise. The frequency of the periods of the MHP of the omitted MHPs which are divided by two is represented by Nw' (=m·p[%]·N). FIG. 18 shows the frequency distribution of the periods of the MHPs which are divided by two again. Assume that a threshold for periods to be regarded as Nw is set to 1.5T0. In this case, the frequency of the periods of MHPs whose periods are equal to or less than 0.5T0 is 0.5 Nw' (=0.5 p[%]·Nw), the frequency of the periods of MHPs whose periods range from 0.5T0 to 1.5T0 is Nw' (=p[%]·Nw), and the frequency of the periods of MHPs whose periods are equal to or more than 1.5T0 is 0.5 Nw' (=0.5 p[%]·Nw).

Figure 19:
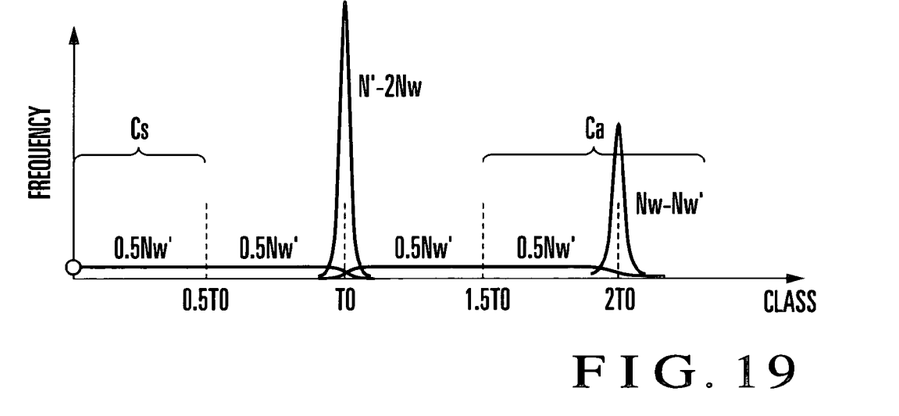
FIG. 19 is a graph showing the frequency distribution of the periods of mode hop pulses, of mode hop pulses omitted at the time of counting, whose periods are divided by two.

Therefore, the frequency distribution of the periods of all the MHPs becomes the one shown in FIG. 19. If a threshold for Ns is 0.5T0 and a threshold for Nw is 1.5T0, a count result N can be expressed by $$N=(N'-2Nw)+(Nw-Nw')+2Nw'=N'-Nw+Nw' \quad (14)$$

The following is the result obtained by correction using equation (14). Obviously, the proper count N' of the MHPs is calculated in a case in which no MHP omission has occurred at the time of counting.

$$N - 0.5Nw' + (0.5Nw' + (Nw - Nw')) = \quad (15)$$
$$(N - Nw + Nw') + (0.5Nw' + (Nw - Nw')) = N'$$

It is obvious from the above description that the count result N can be corrected by setting a threshold for periods to 1.5 times the median when the frequency Nw is to be obtained. Note that as in the case in which the periods of MHPs are divided by two due to noise, since correction is performed by using the median instead of T0, a similar error occurs.

Figure 20:
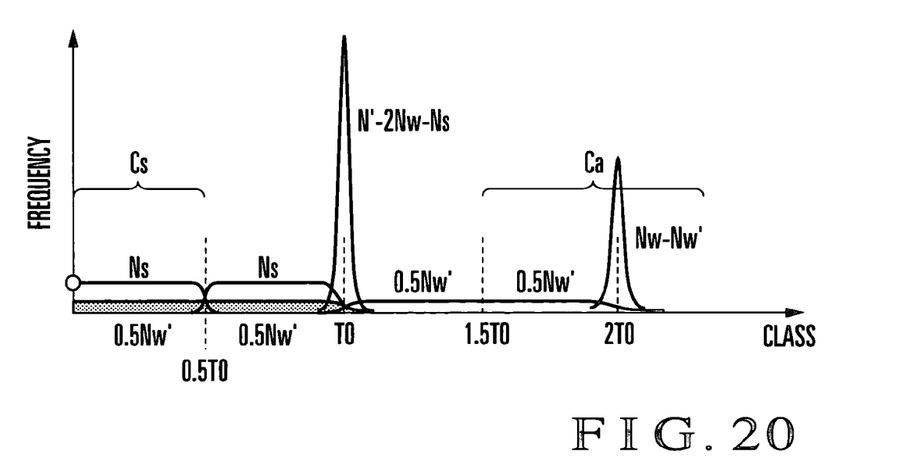
FIG. 20 is a graph showing the frequency distribution of the periods of mode hop pulses when omission and excessive counting of mode hop pulses occur simultaneously at the time of counting.

The above description has separately exemplified the case in which the periods of MHPs are divided by two as a result of excessively counting noise and the case in which the periods of MHPs are doubled due to omissions. Since these cases occur independently, they are expressed by one frequency distribution as shown in FIG. 20. If a threshold for Ns is 0.5T0 and a threshold for Nw is 1.5T0, the count result N can be expressed by $$N = (N' - 2Nw - Ns) + (Nw - Nw') + 2Nw' + 2Ns \quad (16)$$
$$= N' - Nw + Nw' + Ns$$

The following is the result corrected by equation (16). Obviously, the proper count N' of the MHPs is calculated without any omission or excessive counting at the time of counting.

$$N - \{0.5Nw' + Ns\} + (0.5Nw' + (Nw - Nw')) = \quad (18)$$
$$\{N - Nw + Nw' + Ns\} -$$
$$\{0.5Nw' + Ns\} + \{0.5Nw' + (Nw - Nw')\} = N'$$

Referring to FIGS. 18 to 20, Cn represents a portion corresponding to proper counting; Cs, a portion corresponding to counting with subtraction; and Ca, a portion corresponding to counting with addition.

Second Embodiment

The second embodiment of the present invention will be described next. In the first embodiment, a count result is corrected by using a median as a representative value of the periods of MHPs. However, a mode may be used as a representative value of the periods.

Figure 21:
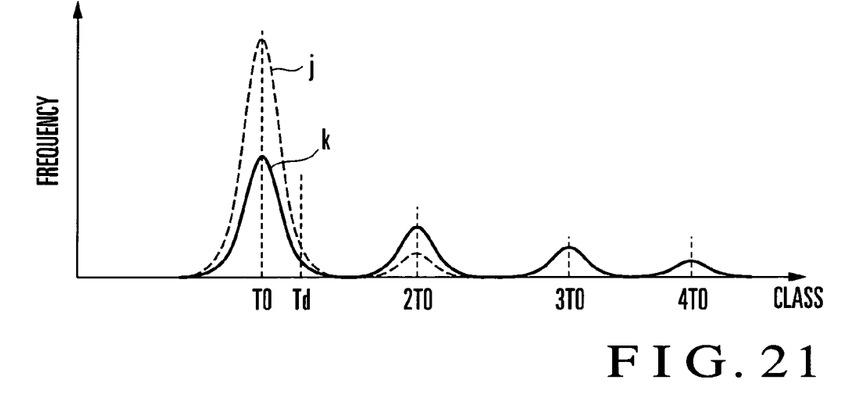
FIG. 21 is a graph for explaining a case in which an error occurs in a count result after correction in the first embodiment of the present invention.

Assume that the frequency distribution of the periods of MHPs shifts from a proper distribution j shown in FIG. 21 to become a distribution k in FIG. 21. In this case, the median of the periods of the MHPs also shifts from a proper value T0 to a value Td. In such a case, if a count result is corrected by using the median Td, an error in the count result after correction increases.

If, therefore, the influence of the shift of a frequency distribution due to noise components is conceivable, a mode is used as a representative value of periods. More specifically, a representative value calculation unit 842 of a count result correction unit 84 calculates the mode of the periods of MHPs from the frequency distribution generated by a frequency distribution generating unit 841. A correction value calculation unit 843 of the count result correction unit 84 performs the same processing as that in the first embodiment by using the mode instead of the median T0.

The average of periods can be used as a representative value although an error in a count result after correction becomes larger than that when the median T0 is used, as described with reference to equations (8) to (12). In this case, the representative value calculation unit 842 calculates the average of the periods of MHPs.

The first and second embodiments have exemplified the case in which the counting device of the present invention is applied to the distance meter. However, the present invention is not limited to this, and the counting device of the present invention can be applied to other fields. The counting device of the present invention can be effectively applied to a case in which the number of signals as a counting target has a linear relationship with a specific physical quantity (a distance in the first and second embodiments), and when the physical quantity is constant, the signals have an almost single frequency.

Even if signals do not have a single frequency, the signals can be regarded as having an almost single frequency when the spread of a period distribution of a specific physical quantity as a counting target like the velocity of a target object which is vibrating at a lower frequency, e.g., a frequency equal to or less than $\frac{1}{10}$ the frequency of the modulated wave is small as compared with the counting interval. The counting device of the present invention can be effectively applied to such a case.

The first and second embodiments have exemplified the case in which correction for an MHP omission is performed when the periods of MHPs become almost twice the proper periods due to one omission. However, the present invention can also be applied to a case in which two or more MHPs are continuously omitted. When two MHPs are continuously omitted, a period three times a median can be regarded as the sum of the periods of three MHPs. In this case, obtaining a frequency in a class almost equal to or more than three times the median of periods and doubling the frequency can correct MHP omissions. When such an idea is generalized, it suffices to use the following equation instead of equation (2).

$$N'=N+Nw1+Nw2+Nw3+\ldots Ns \quad (18)$$

where Nw1 is the total sum of periods in a class equal to or more than 1.5 times the median of the periods, Nw2 is the total sum of periods in a class equal to or more than 2.5 times the median of the periods, and Nw3 is the total sum of periods in a class equal to or more than 3.5 times the median of the periods.

When the first and second embodiments are applied to a distance meter other than the self-mixing type, it suffices to split the light emitted by a semiconductor laser 1 and reflected by a measurement target 12 from incident light to the measurement target 12 by using, for example, a beam splitter and detect the light by using a photodiode 2. This makes it possible to obtain the same effects as those of the first and second embodiments from a distance meter other than the self-mixing type.

Third Embodiment

Figure 22:
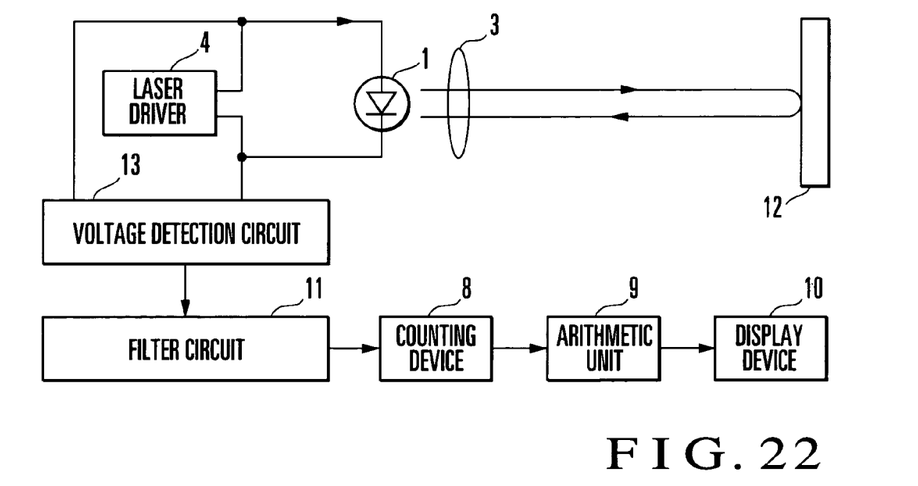
FIG. 22 is a block diagram showing the arrangement of a distance meter according to the third embodiment of the present invention.

In the first and second embodiments, an MHP waveform is extracted from an output signal from a photodiode 2 as a light-receiving device which converts an optical output from the semiconductor laser 1 into an electrical signal. However, it is possible to extract an MHP waveform without using the photodiode 2. FIG. 22 shows the arrangement of a distance meter according to the third embodiment of the present invention. The same reference numerals as in FIG. 1 denote the same components in FIG. 22. The distance meter of this embodiment uses a voltage detection circuit (signal acquisition device) 13 instead of the photodiode 2 and the current/voltage conversion amplifier 5 in the first embodiment.

The voltage detection circuit 13 detects and amplifies the voltage between the terminals of a semiconductor laser 1, i.e., the voltage between the anode and the cathode. When interference is caused by the self-mixing effect between laser beam emitted from the semiconductor laser 1 and optical feedback from a measurement target 12, the voltage between the terminals of the semiconductor laser 1 exhibits an MHP waveform. Therefore, it is possible to extract the MHP waveform from the voltage between the terminals of the semiconductor laser 1. That is, the voltage detection circuit 13 functions as a detector which detects an electrical signal containing an interference waveform caused by the self-mixing effect between laser beam and optical feedback.

A filter circuit 11 has a function of extracting a superimposed signal from a modulated wave as in the first embodiment, and extracts an MHP waveform from an output voltage from the voltage detection circuit 13.

The operations of the semiconductor laser 1, a laser driver 4, a counting device 8, an arithmetic unit 9, and a display device 10 are the same as those in the first embodiment.

In this manner, this embodiment can extract an MHP waveform without using the photodiode 2, and hence can reduce the number of components of the distance meter as compared with the first embodiment, thereby reducing the cost of the distance meter. Note that the photodiode 2 in the first embodiment can be used as a detector like the voltage detection circuit 13.

Although the first and second embodiments can be applied to not only self-mixing type distance meters but also distance meters other than the self-mixing type, the third embodiment is applied to only a self-mixing type distance meter.

As described above, in the above embodiments, the periods of signals input during a counting interval are measured. The frequency distribution of signal periods in the counting interval is generated from this measurement result. A representative value of the signal periods is calculated from this frequency distribution. In addition, the total sum Ns of periods in a class equal to or less than a first predetermined multiple of the representative value and the total sum Nw of periods in a class equal to or more than a second predetermined multiple of the representative value are obtained from the frequency distribution. The count result on the signal input in the counting interval is corrected on the basis of the frequencies Ns and Nw. This makes it possible to correct the count error in the counting device by removing the influences of omissions at the time of counting and excessive counting.

In addition, in the above embodiments, the periods of an interference waveform in a counting interval are measured. The frequency distribution of the periods of the interference waveform in the counting interval is generated from the measurement result. A representative value of the periods of the interference waveform is calculated from this frequency distribution. The total sum Ns of periods in a class equal to or less than a first predetermined multiple of the representative value and the total sum Nw of periods in a class equal to or more than a second predetermined multiple of the representative value are obtained from the frequency distribution. The measurement result on the interference waveform is corrected on the basis of the frequencies Ns and Nw. This makes it possible to correct the interference waveform count error by removing the influences of omissions at the time of counting and excessive counting. It is therefore possible to improve the distance measurement accuracy in the distance meter which obtains the distance to a measurement target by measuring the number of interference waveforms using a counting means.

What is claimed is:

1. A counting device comprising:
    counting means for counting the number of signals input during a counting interval, the number of signals having a linear relationship with a physical quantity, and the signals having a substantially single frequency when the physical quantity is constant;
    period measurement means for measuring a period of a signal every time a signal is input during the counting interval;
    frequency distribution generating means for generating a frequency distribution of signal periods during the counting interval from a measurement result obtained by said period measurement means;
    representative value calculation means for calculating a representative value of a distribution of periods of signals from the frequency distribution generated by said frequency distribution generating means; and
    correction value calculation means for obtaining a total sum Ns of frequencies in a class not more than a first predetermined multiple of the representative value calculated by said representative value calculation means and a total sum Nw of frequencies in a class not less than a second predetermined multiple of the representative value from the frequency distribution generated by said frequency distribution generating means, and correcting a count result obtained by said counting means on the basis of the frequencies Ns and Nw.

2. A device according to claim 1, wherein said representative value calculation means calculates one of a median, a mode, and an average as a representative value.

3. A device according to claim 1, wherein said correction value calculation means obtains a count result N' after correction from a count result N by said counting means according to N'=N+Nw−Ns.

4. A device according to claim 1, wherein said correction value calculation means obtains the total sums Ns and Nw of frequencies in classes with the first predetermined multiple and the second predetermined multiple being 0.5 and 1.5, respectively.

5. A distance meter comprising:
    a semiconductor laser which emits laser beam to a measurement target;
    a laser driver which causes said semiconductor laser to operate such that a first oscillation interval including at least an interval in which an oscillation wavelength continuously and monotonically increases and a second oscillation interval including at least an interval in which the oscillation wavelength continuously and monotonically decreases are alternately present;

a signal acquisition device which acquires an electrical signal containing an interference waveform caused by laser beam emitted from said semiconductor laser and optical feedback from the measurement target;

counting means for counting the number of interference waveforms contained in an output signal from said signal acquisition device;

period measurement means for measuring a period of an interference waveform every time an interference waveform is input during the counting interval;

frequency distribution generating means for generating a frequency distribution of periods of interference waveforms during the counting interval from a measurement result obtained by said period measurement means;

representative value calculation means for calculating a representative value of a distribution of periods of interference waveforms from the frequency distribution generated by said frequency distribution generating means;

correction value calculation means for obtaining a total sum Ns of frequencies in a class not more than a first predetermined multiple of the representative value calculated by said representative value calculation means and a total sum Nw of frequencies in a class not less than a second predetermined multiple of the representative value from the frequency distribution generated by said frequency distribution generating means, and correcting a count result obtained by said counting means on the basis of the frequencies Ns and Nw; and arithmetic means for obtaining a distance to the measurement target from a count result corrected by said correction value calculation means.

6. A meter according to claim 5, wherein said signal acquisition device is a light-receiving device which converts interference light between laser beam and optical feedback into an electrical signal.

7. A meter according to claim 5, wherein said signal acquisition device comprises a detector which detects an electrical signal containing an interference waveform caused by a self-mixing effect between laser beam and optical feedback.

8. A meter according to claim 7, wherein said detector comprises a light-receiving device which converts an optical output from said semiconductor laser into an electrical signal.

9. A meter according to claim 7, wherein said detector comprises a voltage detection circuit which detects a voltage between terminals of said semiconductor laser.

10. A meter according to claim 5, wherein said representative value calculation means calculates one of a median, a mode, and an average as a representative value.

11. A meter according to claim 5, wherein said correction value calculation means obtains a count result N' after correction from a count result N by said counting means according to N'=N+Nw−Ns.

12. A meter according to claim 5, wherein said correction value calculation means obtains the total sums Ns and Nw of frequencies in classes with the first predetermined multiple and the second predetermined multiple being 0.5 and 1.5, respectively.

13. A distance measuring method comprising the steps of:
causing a semiconductor laser to operate such that a first oscillation interval including at least an interval in which an oscillation wavelength continuously and monotonically increases and a second oscillation interval including at least an interval in which the oscillation wavelength continuously and monotonically decreases are alternately present;

acquiring an electrical signal containing an interference waveform caused by laser beam emitted from the semiconductor laser and optical feedback from a measurement target;

counting the number of interference waveforms contained in the acquired electrical signal;

measuring a period of an interference waveform every time an interference waveform is input during a counting interval in which the number of interference waveforms is counted;

generating a frequency distribution of periods of interference waveforms during the counting interval from a period measurement result;

calculating a representative value of a distribution of periods of interference waveforms from the frequency distribution;

obtaining a total sum Ns of frequencies in a class not more than a first predetermined multiple of the representative value and a total sum Nw of frequencies in a class not less than a second predetermined multiple of the representative value from the frequency distribution, and correcting the number of interference waveforms counted on the basis of the frequencies Ns and Nw; and obtaining a distance to the measurement target from a corrected number of interference waveforms.

14. A method according to claim 13, wherein the step of acquiring comprises the step of converting interference light between laser beam and optical feedback into an electrical signal.

15. A method according to claim 13, wherein the step of acquiring comprises the step of detecting an electrical signal containing an interference waveform caused by a self-mixing effect between laser beam and optical feedback.

16. A method according to claim 15, wherein the step of detecting comprises the step of converting an optical output from the semiconductor laser into an electrical signal.

17. A method according to claim 15, wherein the step of detecting comprises the step of detecting a voltage between terminals of the semiconductor laser.

18. A method according to claim 13, wherein the step of calculating comprises the step of calculating one of a median, a mode, and an average as a representative value.

19. A method according to claim 13, wherein the step of correcting comprises the step of obtaining a count result N' after correction from a count result N of signals according to N'=N+Nw−Ns.

20. A method according to claim 13, wherein the step of correcting comprises the step of obtaining the total sums Ns and Nw of frequencies in classes with the first predetermined multiple and the second predetermined multiple being 0.5 and 1.5, respectively.

* * * * *